United States Patent [19]
Witte et al.

[11] 3,885,419
[45] May 27, 1975

[54] METHOD AND APPARATUS FOR ULTRASONIC TESTING OF TUBES AND RODS

[75] Inventors: Fritz Witte, Dortmund; Heinrich Bockstiegel, Witten-Stockum, both of Germany

[73] Assignee: Mannesmannrohren Werke Aktiengesellschaft, Dusseldorf, Germany

[22] Filed: July 24, 1972

[21] Appl. No.: 274,623

[30] Foreign Application Priority Data
July 29, 1971  Germany.............................. 2138458

[52] U.S. Cl.............................................. 73/67.5 R
[51] Int. Cl. ........................................... G01n 29/04
[58] Field of Search............... 73/67.5 R, 67.6, 67.7, 73/67.8 S, 67.8 R, 67.9

[56] References Cited
UNITED STATES PATENTS

| | | | |
|---|---|---|---|
| 2,795,133 | 6/1957 | Ots..................... | 73/67.7 |
| 3,052,115 | 9/1962 | Renaut et al..................... | 73/67.5 R |
| 3,415,111 | 12/1968 | Chattaway et al................ | 73/67.8 S |
| 3,557,610 | 1/1971 | Wilson............................ | 73/67.5 R |

*Primary Examiner*—Richard C. Queisser
*Assistant Examiner*—John P. Beauchamp
*Attorney, Agent, or Firm*—Ralf H. Siegemund

[57] ABSTRACT

Plural ultrasonic transmitter-receiver units are rotated about a pipe or rod to be tested and alternatingly operated in receiving and transmitting modes so that for a quarter turn four helical quadrants are tested and the pipe can axially advance by a distance equal to 4 times the beam width during one complete revolution.

8 Claims, 4 Drawing Figures

METHOD AND APPARATUS FOR ULTRASONIC TESTING OF TUBES AND RODS

BACKGROUND OF THE INVENTION

The present invention relates to nondestructive testing of pipes and rods or the like for detecting surface fissures as well as lamination, inclusions or other defects in the interior of such objects. More particularly the invention relates to a method and apparatus for testing objects by means of ultrasonic pulses which are reflected by such defects, and the reflected pulses are received and indicated.

A pulse echo method (sonar) is known which uses a single test unit and includes a transmitter as well as a receiver. This equipment is predominantly used for testing elongated work pieces and in the direction of extension thereof. Equipment using separated transmitter and receiver is used mostly for examining any kind of objects for defects. Also, separated transmitter and receiver units are used for ultrasonic testing of rods and pipes whereby the test radiation is transmitted transversely to the respective axis. Particularly, in the case of pipes, the ultrasonic pulse penetrates somewhat radially into the pipe wall and propagates azimuthally through the pipe by repeated reflexion at the inner and outer surface. The receiver is displaced by about 90° relative from the transmitter and in relation to the axis of the pipe or rod to be tested. In order to test the entire volume of a pipe transmitter and receiver rotate on the axis of the pipe as the pipe advances axially. Thus, the test unit operates as a helix. The rate of axial movement of the pipe depends on the width of the test pulse. Usually the pipe advances by about 5 mm (about one-fifth inch) for each revolution of the test equipment. The rotational speed of the equipment is limited by the pulse rate frequency and that limits the overall test speed.

It has been suggested to test a pipe in several axial planes concurrently, using several test units along the pipe's axis. Each test unit (having transmitter and receiver in angularly displaced relation) tests a different helical portion of the pipe. In other words, the test is carried out along two intertwined helical test tracks. Other parameters being the same, the test speed can about be doubled by doubling the axial speed of the pipe through the test stand. A slight overlap of the test track helices does not change these considerations in principle. Nevertheless, the speed can be increased only by increasing the number of test units strictly proportionally. Moreover, it is more difficult to localize defects with this method because different pipe sections are tested concurrently.

It should be mentioned that other test methods are known in which through-radiation is modulated by defects, and equipment is known here which alternates between opposite directions of penetration. The invention does not relate to equipment of this kind.

DESCRIPTION OF THE INVENTION

It is an object of the present invention to provide for an increase in the test speed without incurring the drawbacks of the known methods in which the test speed can be increased only in direct proportion to corresponding increase in test equipment.

In accordance with the preferred embodiment of the invention, it is suggested to provide several (at least three) test units in one plane, at right angles to the direction of predominant extension of the object to be tested. Relative rotation is provided between the test units and the pipe or rod to be tested, and on the axis of the latter. The units are alternatingly operated as transmitter and as receiver for ultrasonic pulses, while at least some of the units operate sequentially as transmitter for transmitting ultrasonic pulses in similar directions and into the test object as far as azimuthal component of propagation is concerned. A unit not transmitting in any instant operates as receiver which is particularly angularly displaced from a unit that operates as transmitter in that instant, but will transmit pulses in the same direction when operated as transmitter, then cooperating with another unit displaced further in the same direction and then operating as receiver, etc.

It was found that these units, being displaced from each other by 120° about the axis of a pipe, are sufficient for testing the pipe, but four units are better; one or two operating as transmitter in any instant, another one or the other two then operate as receiver, and they alternate in their mode of operation in a particular sequence corresponding to progressive test scanning of the different portions of the object.

Using four units requires twice the equipment expenditure as compared with a two-unit test apparatus of which one operates always as transmitter, the other one as receiver. The expenditure, therefore, is similar to two known two-unit apparatus each working on a different helix. However, the four-unit test equipment of the invention permits quadrupling of the test speed rather than only doubling it. The reason for this will become apparent from the following:

It may be assumed that a first unit has issued a first pulse; that unit needs to issue another pulse only after a particular period of time during which the pipe or the equipment has turned by a particular angle. In the meantime, each of the three other units has issued a pulse, one after the other. Different sectors of the pipe or rod are being tested in that manner. After one-quarter of a turn, four different axially and azimuthally displaced helix sectors have been tested and the pipe or rod may advance axially by a distance equal to the width of a (helical) test track during one-quarter turn. Therefore, the pipe may advance by a distance equal to 4 times that width for one complete turn of the test equipment as during that period four axially juxtaposed one-turn helices have been tested, each having a width equal to the width (axially) covered by any test unit in any instant.

It was found advisable to operate the units as transmitter in the same sequence in which they are arranged around the axis of the pipe or rod. Moreover it is suggested to detect only those signals which have propagated through the pipe or rod in the direction toward the next unit, and that next unit is then to be operated as receiver in that instant.

As stated, the test speed is also (indirectly) proportional to the pulse rate frequency used in the echo method. This is so, as the relation between relative object — test unit speed in any direction, and pulse rate frequency, determines resolution and accuracy of defect detection. Of course, at least one unit operates as transmitter in any instant, so that there is almost continuous transmission, but any one unit transmits only intermittently (with a duty factor of at the most 50 percent) and operates as receiver or is idle for the in-between periods. Pipe material moves underneath in the meantime and must not move too much, so that nothing remains untested. That condition limits the relative speed between test unit and object. Consequently, the pulse rate frequency should be as high as feasible.

In order to test e.g. boiler tubes, the pulse rate frequency should amount to several kilohertz. If the pipes to be tested have very large diameter or if the units employed operate at lower pulse rate frequency, it may be necessary to operate the units in groups and/or to employ more than four units, whereby the units of a group run in parallel. The units of a group may be placed next to each other on the circumference, and the group formation control progresses about the axis.

By way of example, if four units are regularly disposed about a pipe to be tested, respective oppositely disposed two of them operate concurrently as transmitters and direct radiation for predominant propagation e.g. clockwise in the viewing plane. The respective other two operate as receivers in directional association with the units that operate as transmitters. In the next pulse rate cycle, the operational modes are exchanged, but so is the grouping, as each unit, when transmitting, transmits clockwise. In case more than four units are employed, it may still be advisable to operate only two units which are 180° apart, concurrently as transmitters. The operational mode of transmitting moves from unit to unit e.g. clockwise, so does the mode of receiving. If the pipe is very large, more than two such parallel or concurrently operating groups can be constituted in any instant, provided the transmitting units are sufficiently far apart to avoid undue interference.

The units are preferably mounted on a ring which rotates on the axis of the pipe and is telescoped on the pipe as the latter advances axially.

While the specification concludes with claims particularlyy pointing out and distinctly claiming the subject matter which is regarded as the invention, it is believed that the invention, the objects and features of the invention will be better understood from the following description taken in connection with the accompanying drawings in which:

FIGS. 1 through 4 illustrate somewhat schematically test equipment in accordance with the preferred embodiment of the invention, and during different phases of operation.

DESCRIPTION OF THE DRAWINGS

Turning now to the detailed description of the drawings, the Figures illustrate a pipe to be tested for defects, the pipe being identified respectively by outer and inner surfaces 1 and 2. These surfaces provide for reflexion of ultrasonic radiation transmitted into the pipe. A plurality of test units is mounted on a support ring 13. The ring rotates clockwise while the pipe advances perpendicularly to the plane of the drawings.

The illustrated equipment includes four test units 4, 5, 6 and 7 mounted with 90° angular spacing. Each unit has a position so that the direction 8 of transmission (when the unit operates as transmitter) has an oblique angle to a radial line such as 3. This angle depends on the dimensions of the pipe to be tested, because this angle determines the direction of propagation of the ultrasonic radiation inside of the pipe and relative to the surfaces on which total reflexion is to occur. Usually this angle is about 10° to 20°.

The units are adjustably mounted on ring 13 for initial adjustment and fine trimming. However, the angle between 8 and 3 should be the same for all units and should remain constant throughout the operation. The equipment operates in a suitable, low loss coupling medium for the ultrasonic wave energy actually water suffices and is customarily used in equipment of this type.

The units 4, 5, 6 and 7 include, for example, a quartz member which is electically stimulated to issue ultrasonic waves. The same member may act as receiver with pick-up electrodes to be responsive to ultrasonic waves when received. Each unit includes circuitry which permits its operation selectively as transmitter and receiver. The units are operated by a sequencer 20 alternating each unit between transmitting mode and receiving mode and running all units through these modes in particular sequence, as will be described below. The units on rotating ring 13 are coupled to the sequencer through conventional means used to transmit electrical signals between a rotating and a stationary part (slip rings or the like).

Generally speaking sequencing and operating in a loop is well known, and is usually performed by a counter particularly a ring counter or recycling counter or shifting counter. It means generally that bistable stages (flip flops) are interconnected and their combination of outputs establishes different operational states in a system. Presently, sequencing means that one operational state requires, for example, one unit to operate as transmitter, another unit to operate as receiver, other units to be idle; in the next sequenced state the same functions are performed by these units but in a different combination as will become apparent in detail with reference to FIGS. 1 through 4. Counters etc. for performing such sequencing and enabling are well-known. Reference is made here, for example, to Husky and Computer Handbook, or Richard's "Digital Computer Components and circuits", "Arithmetic operations in Digital Computers," and others. See also U.S. Pat. No. 3,356,996 for a rather detailed description of an extensive sequencing of a system through various phase of operation. The present sequencer is much simpler.

Figure 1:
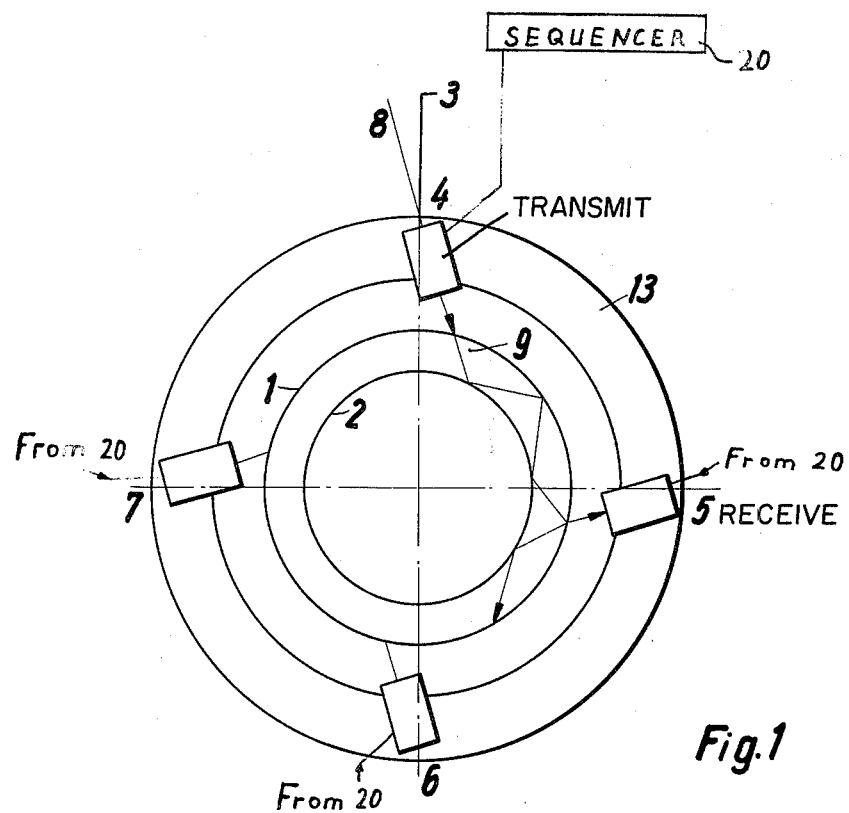

As shown in FIG. 1, unit 4 is assumed to issue a first ultrasonic pulse propagating in the pipe along a path 9, In the case of a defect within the pipe, somewhat to the right of unit 4, unit 5 is undoubtedly best suited for receiving and detecting a wave component that has been reflected by the defect. Speaking more broadly, unit 5 will respond best to any intensity modulation of the radiation as received whenever unit 4 transmits. That modulation is indicative of defect. Accordingly, unit 5 is concurrently operated in the receiver mode. Due to the directional orientation of pulse transmission, unit 7 will receive little from transmitter 4.

Figure 2:
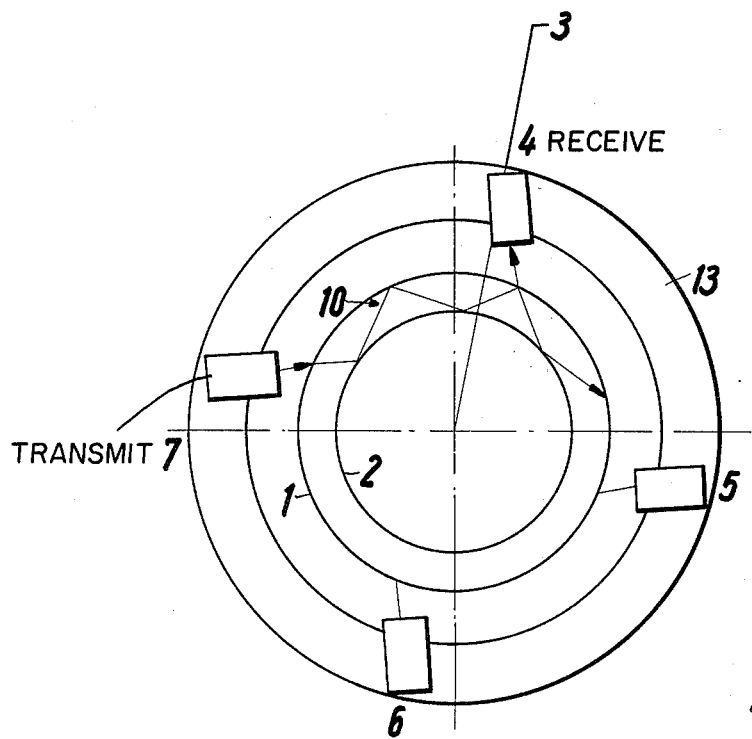

FIG. 2 illustrates the disposition of the equipment shorly thereafter. The ring 13 has rotated by a small angle and the sequencer controls the units so that unit 7 operates in the transmitting mode, while unit 4 operates in the receiving mode. Unit 7 issues a wave that propagates along a path 10, and unit 4 serves as receiver, particularly for receiving a strong reflexion when there is a defect in the pipe between units 7 and 4.

It should be mentioned, however, that the angular displacement of ring 13 in between mode changes is greatly exaggerated in the drawings.

By way of example, the ring 13 may rotate at 3,000 RPM. The pulse rate frequency (and, therefore, the mode change frequency) may be about 10 KHz. Under these conditions, each unit will issue 50 pulses per one-quarter turn of the ring. The pipe advances during the same period by a distance about equal to the width of the test beam in axial direction (transverse to the plane of the drawing).

In the next phase (FIG. 3), unit 6 operates as transmitter and unit 7 is operated as receiver, the radiation traveling along path 11; and in the final phase (FIG. 4) unit 5 is the transmitter and unit 6 is the receiver as the radiation propagates along path 12. It can thus be seen that each unit provides a short pulse, followed by a period of like duration in which the unit operates as receiver, followed by two pulse duration periods in which the unit operates either as secondary receiver or is disabled. Sequencing as to any transducer, therefore, means merely to run it through the sequence transmit, recieve, idle, idle. This can be realized by a counter which recycles to zero following count state 3 (i.e. a simple two stage binary counter) and the connection to the units is such that each count state enables the units differently, so that always one transmits, one receives and two are idle. These latter two periods can be eliminated by operating always two oppositely positioned units as transmitters to test oppositely located pipe portions, while the two other units operate in the receiving mode.

Figure 3:
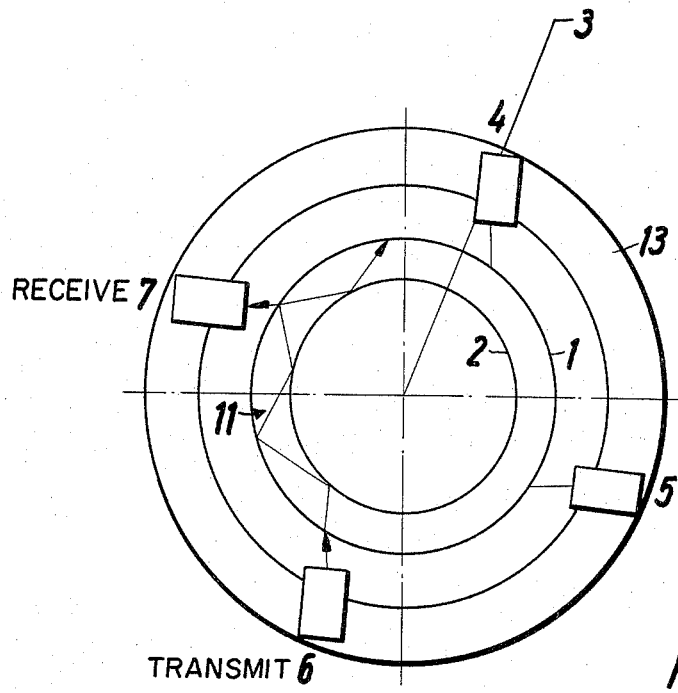
Figure 4:
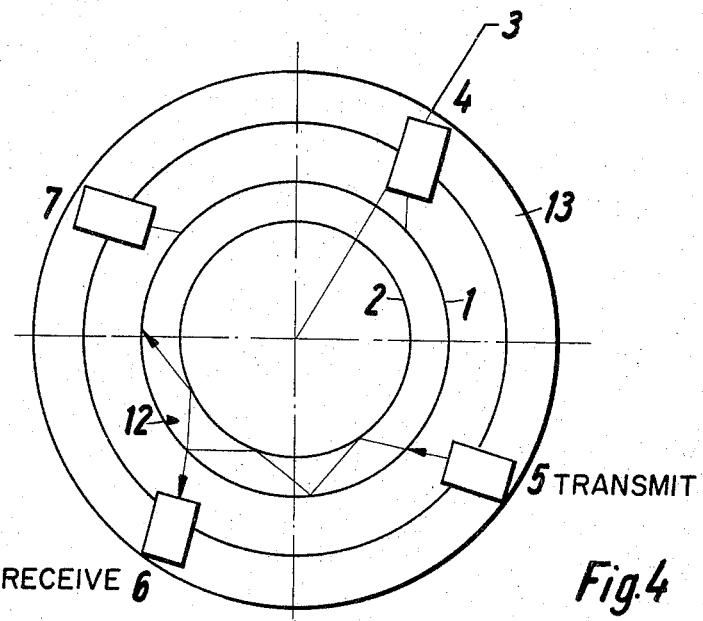

It can be seen that in this case, units 4 and 5 establish a first test group and units 6 and 7 establish a second test group, when units 4 and 6 run in the transmitter mode, while units 5 and 7 run in the receiving mode (FIGS. 1 and 3 to be interpreted as concurring phases). Upon mode change in all units, units 7 and 4 establish one test group and units 5 and 6 establish a second group; units 4 and 6 running in the receiver mode while units 5 and 7 operate in the transmitter mode (concurrance of FIGS. 2 and 4). The sequencer can be a simple toggle flip flop in this case whose set-state enables units 4 and 6 as transmitters and units 5 and 7 as receivers, while the reset state reverses the enabling conditions. The sequencing clock simply alternates the states.

Each unit operates as transmitter as long as the respective next unit is operated as receiver and vice versa. "Next unit" refers to the unit which will predominantly receive radiation by operation of the orientation of the transmitting unit as transmitting obliquely relative to a radius towards the associated receiver. Under these rules, three units, displaced from each other by 120°, could operate as follows:

One unit is transmitter, the second (next) unit is receiver and the third unit is idle or a secondary receiver. Shortly thereafter, the second unit is transmitter, the third unit is receiver, and the first unit is idle; and so forth. In case of six units, the units are spaced apart by 60°, and the latter operation is duplicated in that units which are displaced by 180° operate in the same mode. Alternatively, three units 120° apart transmit, the respectively interspaced ones receive and the modes just alternate. This will work only (i.e. without undue interference) if the pipes have relatively thin walls in relation to the diameter, so that each receiving unit receives essentially only radiation that originated in the closest transmitting unit and in proper direction.

The invention is not limited to the embodiments described above but all changes and modifications thereof not constituting departures from the spirit and scope of the invention are intended to be included.

We claim:

1. Method of continuous testing of rods or pipes, progressively in axial direction and by means of ultrasonic pulses to be received for detection of defects, comprising the steps of, using a plurality of at least three test units arranged in a plane transverse to said axis and in angularly spaced apart relation to each other;

rotating the units on the axis relative to the pipe or rod to be tested;

providing for axial movement as between the pipe or rod and the units for progressively testing the pipe or rod; and sequencing the units so that each unit alternates between transmission of ultrasonic energy and responsiveness for receiving such energy, a unit of the plurality operating for receiving being spaced apart from a unit operating for transmission in angular direction corresponding to the direction of transmission into the rod or pipe to be tested.

2. Method as in claim 1, wherein the units of the plurality are operated as transmitters in a sequence corresponding to an order of arrangements of the units about said axis.

3. Method as in claim 1, wherein a unit of the plurality operated for receiving is disposed angularly next to a unit operated for transmitting in the same instant.

4. Method as in claim 1, wherein the plurality includes more than three units, the units operated in groups, one unit of a group being operated as transmitter, another unit of the group being operated as receiver, the formation of groups progressing angularly about the axis by operation of the alternation between transmission and receiving of each unit.

5. In an apparatus for continuous testing of rods or pipes progressively in axial direction and by means of ultrasonic pulses to be received for detection of defects, the improvement comprising a plurality of at least three transmitter-receiver units arranged in a plane transverse to said axis and angularly arranged in spaced apart relation to each other, and means for supporting the units of the plurality and for rotating on the axis relative to the pipe or rod to be tested, there being axial movement between the pipe or rod and the unnits as disposed for rotation;

means for sequencing the units so that each unit alternates between transmission of ultrasonic energy and responsiveness for receiving such energy, a unit of the plurality operating for receiving being spaced apart in angular direction from a unit of the plurality operating for transmission, the angular direction corresponding to the direction of transmission into the pipe or rod to be tested.

6. Apparatus as in claim 5, wherein the means for supporting is a ring rotating on the axis.

7. Apparatus as in claim 5, wherein each unit is mounted on the means for supporting so that the direction of transmission is at an angle to a radial direction on the axis, corresponding to said angular direction, said angle being similar for all units of the plurality.

8. Apparatus as in claim 5, wherein the means for sequencing operates whereby half of the units operate for transmission, the other half operates for receiving, the units alternating between transmitting and receiving accordingly.

* * * * *